April 12, 1932. A. P. BRUSH Re. 18,423

BRAKE MECHANISM

Original Filed July 16, 1923 2 Sheets-Sheet 1

Inventor

ALANSON P. BRUSH

By

M. W. McConkey

Attorney

April 12, 1932. A. P. BRUSH Re. 18,423

BRAKE MECHANISM

Original Filed July 16, 1923 2 Sheets-Sheet 2

Inventor

ALANSON P. BRUSH

By

Jn. W. McCauley

Attorney

Reissued Apr. 12, 1932 Re. 18,423

UNITED STATES PATENT OFFICE

ALANSON P. BRUSH, OF DETROIT, MICHIGAN

BRAKE MECHANISM

Original No. 1,652,757, dated December 13, 1927, Serial No. 651,869, filed July 16, 1923. Application for reissue filed January 9, 1928. Serial No. 245,597.

The invention relates to vehicle brake mechanisms and it is the primary object of the invention to obtain a simple and inexpensive construction. It is the further object to obtain certain advantages as hereinafter set forth.

In the present state of the art brake mechanisms are of two general types, in one of which a rigid brake shoe is moved radially into contact with the brake drum, while in the other a flexible brake band is moved circumferentially into contact with the drum. With the first type the arc of contact is less than 180°, while with the second type the friction of the portions of the band initially contacting with the drum may cause, in the case of an external brake, a wrapping effect, or, in the case of an internal brake, an unwrapping effect which will assist in applying braking pressure, thereby reducing the amount of power required. On the other hand, with the first type the amount of movement required for setting the brakes or for compensating for wear is approximately one-sixth the amount required for the circumferential movement of the flexible band; also a simpler construction of operating mechanism can be employed.

My improved construction combines the advantages and eliminates the defects of both types above referred to. This is accomplished; first, by employing a band having a flexible portion which is movable by a wrapping or unwrapping movement into full contact with the drum; second, by actuating the band radially instead of circumferentially so as to reduce the amount of movement required; third, by providing a rigid segment which is preferably directly actuated by the radial movement to contact with the drum and which prevents excessive wear at the point of application of said radial pressure. As a result a high braking torque may be obtained with a small initial force and a small movement of the pedal for taking up the initial clearance or that occasioned by wear.

Figure 1:
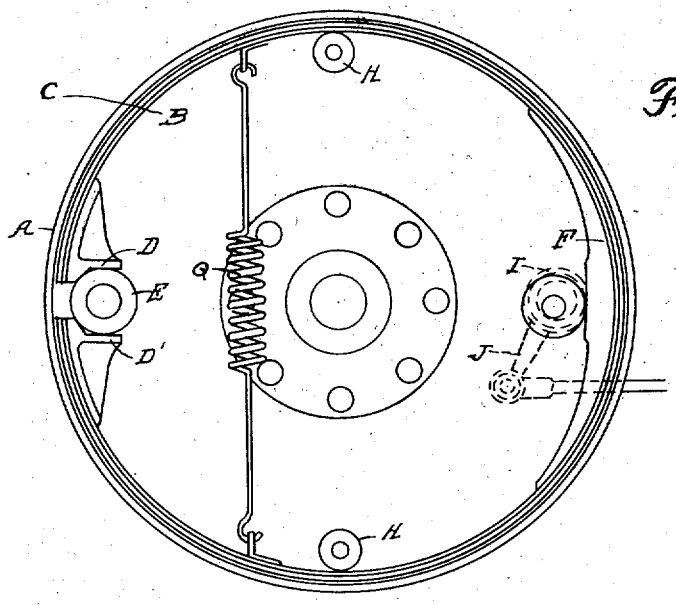
Figure 1 is a side elevation of a brake of my improved construction.

While my invention in its broader aspects is applicable to various constructions of brakes, I have specifically illustrated only its application to an internal brake. As shown in Figure 1, A is the brake drum, B the brake band or ring, cut through at one side of the drum to form separable ends, and having the usual lining C and provided at its opposite ends with flanges or shoulders D and D′ for engaging anchoring means such as a stationary abutment E. Diametrically opposite the abutment E the band is reinforced to be substantially rigid by a comparatively rigid segmental member F, which as shown is approximately 90°. To apply the brake the member F is moved radially towards the drum A and the friction produced by contact with the drum will cause a circumferential movement of the band which is resisted at one end by the shoulder D or D′, according to the direction of rotation of the drum. As a consequence, an outward radial pressure is developed in each portion of the band between the abutment and the further end of the rigid section, which will produce a smooth braking effect and will uniformly distribute the wear. The function of the rigid section F is to avoid localizing the wear due to the initial frictional engagement and to distribute this wear uniformly over the whole extent of the rigid segment. Furthermore, by reason of this rigid segment, approximately 125° of the surface of the band is brought into action.

Figure 2:
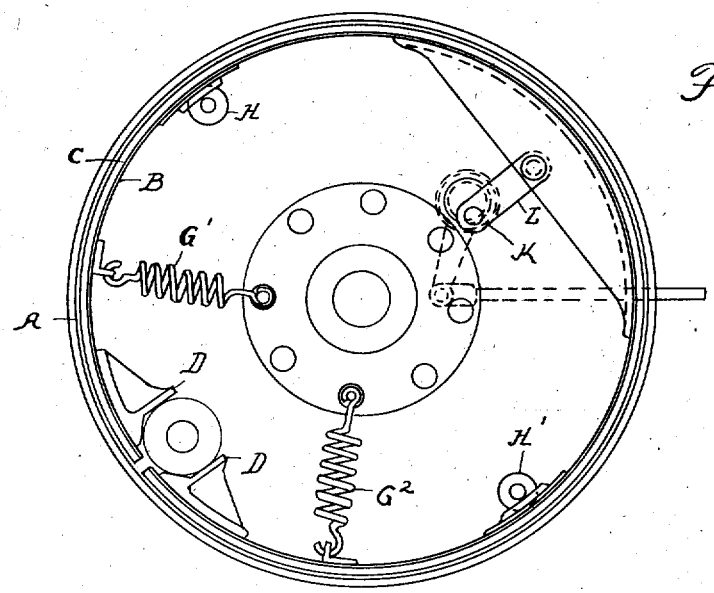
Figure 2 is a similar view slightly modified.

For releasing the band and for holding the same normally out of contact with the drum, there is provided a suitable retracting spring, such as G, and guides, such as H. The radial pressure upon the member F may be applied by any suitable means, such as the eccentric I operated by a rock arm J, as indicated in Figure 1, or by the crank K and link L, as indicated in Figure 2. With the latter construction two retracting springs G′ and $G^2$ are shown.

Figure 4:
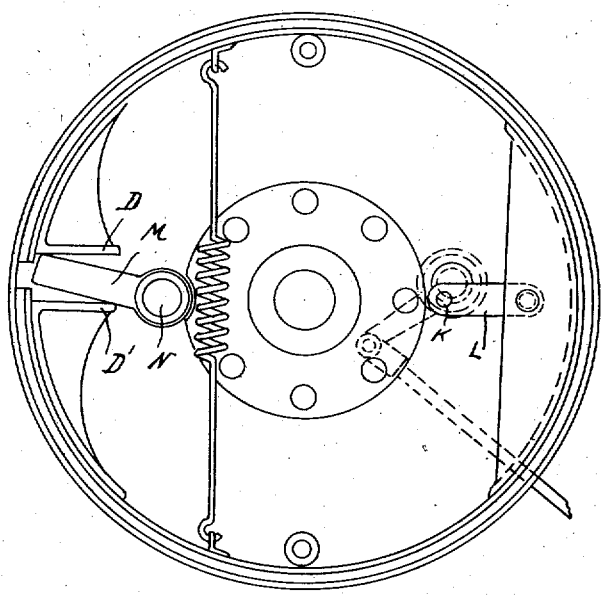
Figure 4 is a view similar to Fig. 2 of still another modification.
Figure 3:
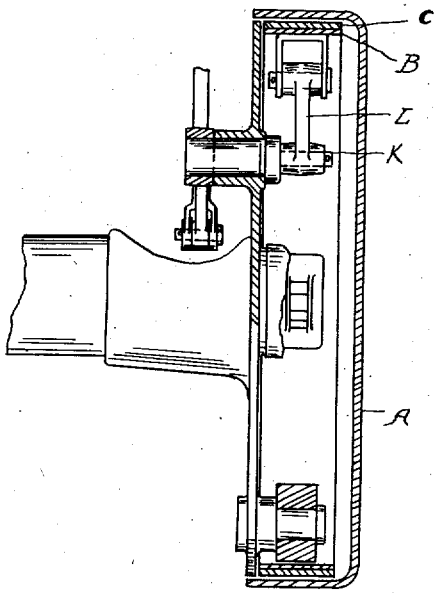
Figure 3 is a cross section of the construction shown in Figure 2.

The construction shown in Figure 4 is similar to that shown in Figures 1 and 2 with the exception that a rockable stop M is substituted for the rigid stop E. As shown, this stop M is pivotally mounted at N and extends between the end shoulders D and D′ at the ends of the brake band. With this construction, when torque is developed in the band by the initial frictional engagement of the rigid portion, the whole band will rotate moving with it the member M. This member will, however, operate as a lever of the third class, which by its changing angularity will enlarge the space between the abutments D and D′ and will develop outward radial pressure in the whole of the band. Thus the added advantage is obtained of bringing the entire band into action during either direction of rotation of the drum.

What I claim is:

1. The combination with a brake drum, of a flexible brake band adjacent thereto, an abutment for one end of said band, means for directly applying outward radial pressure to a point in said band spaced from said abutment point while permitting circumferential movement of the band between said points, whereby the initial friction will develop in said band radial pressure against the drum at all points between said abutment and pressure applying point.

2. The combination with a brake drum, of a flexible brake band adjacent thereto, an abutment for one point in said band, a rigid segment in said band spaced from said abutment point, and means for directly applying outward radial pressure to said rigid segment while permitting freedom for circumferential movement, for the purpose described.

3. The combination with a brake drum, of a flexible split brake band adjacent thereto, torque-taking means for the ends of said split band, and means for directly applying outward radial pressure to said band at a point intermediate the ends thereof while permitting free circumferential movement in either direction, for the purpose described.

4. The combination with a brake drum, of a flexible split brake band adjacent thereto, torque-taking means for the ends of said band at one point therein, a rigid segment in said band intermediate the ends thereof, and means for directly applying outward radial pressure to said segment while permitting free circumferential movement thereof in either direction.

5. The combination with a brake drum, of a flexible internal split brake band therein, an abutment arranged between the ends of said band, a rigid segment in said band intermediate the ends thereof, and means for directly applying outward radial pressure to said rigid segment, for the purpose described.

6. The combination with a brake drum, of a flexible internal split brake band therein, an abutment between the ends of said band, a rigid segment in said band intermediate the ends thereof, and means for applying outward radial pressure to said rigid segment comprising a crank and link, permitting free circumferential movement in either direction.

7. The combination with a brake drum, of a split flexible brake band adjacent thereto, an abutment between the ends of said band, a rigid segment in said band intermediate the ends thereof, means for directly applying radial pressure to said rigid segment while permitting free circumferential movement thereof, and means actuated by the circumferential movement of the band for relatively moving the ends thereof, whereby radial pressure is developed in all portions of the band.

8. The combination with a brake drum, of a split flexible brake band therein, a rigid segment in said band intermediate the ends thereof, means for directly applying radial pressure to said segment, permitting free circumferential movement thereof, and a rockable abutment member between the ends of said band actuated by the circumferential movement thereof to spread said ends and to develop radial pressure in all portions of the band.

9. The combination with a brake drum, of a flexible split brake band adjacent thereto, torque-taking means for the ends of said split band, means for directly applying outward radial pressure to said band at a point intermediate the ends thereof while permitting free circumferential movement in either direction, and guiding means for said flexible brake band intermediate said torque-taking means and pressure applying means.

10. The combination with a brake drum, of a flexible split brake band adjacent thereto, torque-taking means for the ends of said split band, a rigid segment in said band intermediate the ends thereof, guiding means for said band between said torque-taking means and said rigid segment, means for directly applying outward radial pressure to said rigid segment while permitting freedom for circumferential movement, and resilient retracting means connected to said band.

11. The combination with a brake drum, of a flexible internal split brake band therein, an abutment arranged between the ends of said band, a rigid segment on said band intermediate the ends thereof, guiding means intermediate said abutment and said rigid segment for holding said flexible brake band adjacent said brake drum, and means for directly applying outward radial pressure to said rigid segment.

12. The combination with a brake drum, of a flexible internal split brake band therein, an abutment between the ends of said band, a rigid segment in said band intermediate the ends thereof, guiding means between the ends of said band and said rigid segment for holding said flexible band adjacent said brake drum, means for applying outward radial pressure to said rigid segment, and resilient retracting means connected to said brake band and arranged to normally urge said flexible brake band inwardly from said brake drum.

13. A friction device for a brake in the form of a floating ring cut through at one point to provide separable ends and constructed to anchor on either of said ends, and having at least one rigid segment and an adjacent flexible segment.

14. A brake member comprising a ring cut through at one point to provide separable ends and constructed to anchor on either of said ends, and having a plurality of flexible portions and an interposed rigid portion.

15. A friction device for a brake comprising an expansible ring cut through at one point to provide separable ends and adapted to anchor at either of said ends, and which is reinforced to be substantially rigid in at least one segment not more than 180° long, the ring as a whole being expansible.

16. A brake comprising, in combination, a drum, a floating band which has an intermediate segment substantially rigid and which is substantially flexible on opposite sides of said segment, and an abutment against which one of the ends of the band anchors when the drum is turning in one direction and against which the other of said ends anchors when the drum is turning in the other direction.

17. A brake comprising, in combination, a drum, a floating expansible band which as a whole is substantially flexible but which nevertheless has a rigid segment, and anchoring means engaged by one part of said band other than said segment when the drum is turning in one direction and by a different part of said band when the drum is turning in the other direction.

18. A brake comprising, in combination, a drum, a floating expansible band within the drum which is reinforced at least in one segment to be substantially rigid, an anchoring abutment between the ends of the band, and two positioning devices on opposite sides of a center line passing through said abutment and which co-operate with the abutment in determining the released position of the band.

19. The combination with a brake drum, of a flexible internal split brake band therein, an abutment arranged between and taking the braking torque from the ends of said band, a portion of said band intermediate said ends being reinforced to render it substantially rigid, and applying means for forcing the band against the drum.

20. The combination with a brake drum, of a flexible internal split brake band therein, an abutment arranged between and taking the braking torque from the ends of said band, a single portion of said band of considerable length being reinforced to render it substantially rigid, and applying means for forcing the band against the drum.

21. The combination with a brake drum, of floating expansible friction means shiftable bodily with the drum and having adjacent separable ends, applying means for forcing the friction means against the drum, and torque-taking means operated by the shifting of the friction means to force said ends apart to increase the braking pressure.

22. The combination with a brake drum, of floating expansible friction means shiftable bodily with the drum and having adjacent separable ends, applying means for forcing the friction means against the drum, and an abutment between said ends moved by the shifting of the friction means to force said ends apart to increase the braking pressure.

23. A brake comprising floating friction means having separable ends, in combination with torque-taking means engaging said ends and operated by the torque of the brake to force said ends apart and brake-applying means separate from said torque-taking means.

24. A brake comprising a drum and floating friction means having separable ends, in combination with a torque-taking abutment pivoted adjacent said ends and swung by the torque of the brake to force said ends apart in either direction of rotation of the drum.

25. In a brake mechanism, a rotatable drum, braking means therefor comprising a circular split band having a rigid primary portion and a flexible secondary portion, said primary portion engaging said drum to apply braking force to substantially all of said secondary portion.

26. In a brake mechanism, a rotatable drum, braking means therefor comprising integral rigid primary and flexible secondary portions, substantially all of said flexible portion being expanded to engage said drum by the frictional engagement of said primary portion with said drum.

27. In a brake mechanism, a rotatable drum, braking means therefor comprising a circular flexible split band having a rigid reinforcing member extending around a portion of the circumference thereof, and actuating means for engaging said reinforced portion of said band with said drum whereby movement of said reinforced portion with said drum forces substantially all of the flexible portion of said braking means to engage said drum to retard rotation thereof.

28. In a brake mechanism, a rotatable drum, a brake engageable therewith having integral rigid primary and flexible secondary portions, and means for moving said primary portion into engagement with said drum, said engagement of said primary portion with said drum expanding substantially all of said flexible secondary portion into frictional engagement with said drum.

29. In a brake mechanism, a rotatable drum, a brake therefor comprising integral rigid primary and flexible secondary portions, means for moving said rigid primary portion into contact with said drum to expand the major portion of said flexible secondary portion to frictionally engage said drum, and means to prevent rotation of said secondary portion.

30. In a brake mechanism, a rotatable drum, a brake engageable therewith having integral rigid and flexible portions, a stop for the ends of said brake, and means for moving said rigid portion to engage said drum, movement of said portion with said drum expanding substantially all of said flexible portion to engage said drum, said stop preventing rotation of said brake.

31. In a brake mechanism, a rotatable drum, a brake engageable therewith comprising a flexible band and a rigid member secured to the inner face thereof and extending for a portion of the length of said band, a stop for the ends of said band to limit the movement thereof relative to said drum, and means for moving the rigid portion of said band into engagement with said drum, rotation of said rigid portion expanding substantially all of the flexible portion of said band to engage said drum.

32. In a brake mechanism, a rotatable drum, braking means engageable therewith having a rigid portion and a flexible portion integral with said rigid portion, means connected to the rigid portion intermediate the ends of said braking means for moving said rigid portion to engage said drum, thereby expanding substantially all of said flexible portion to engage said drum and means for preventing rotation of said braking means.

ALANSON P. BRUSH.